Dec. 24, 1935.  M. P. LAURENT  2,025,112
PIPE COUPLING
Filed May 19, 1932   4 Sheets-Sheet 1
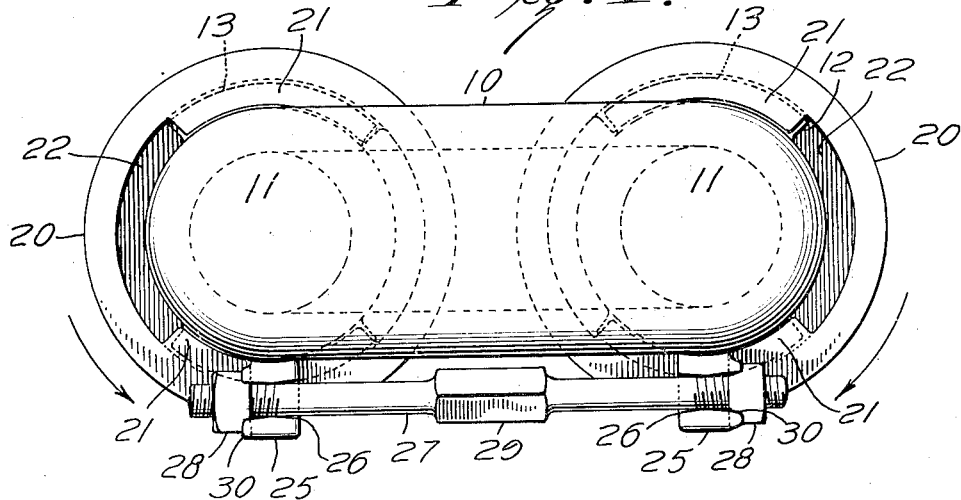
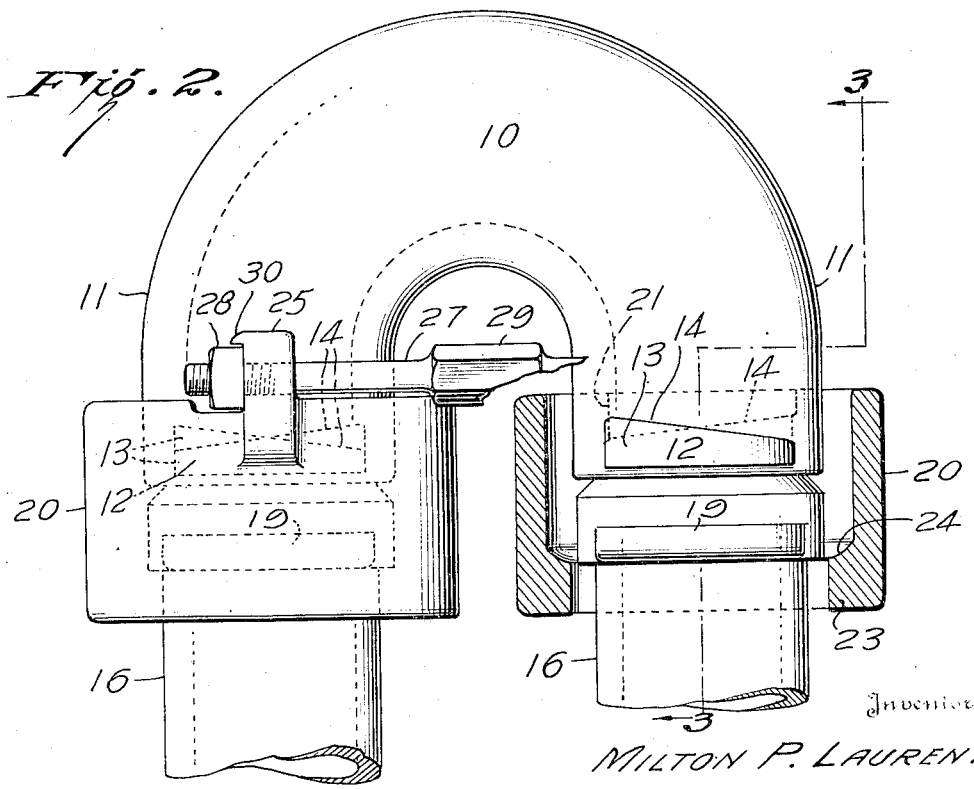
Milton P. Laurent, Dec. 24, 1935.  M. P. LAURENT  2,025,112
PIPE COUPLING
Filed May 19, 1932  4 Sheets-Sheet 2

Inventor
MILTON P. LAURENT,
By
Attorney

Dec. 24, 1935. M. P. LAURENT 2,025,112
PIPE COUPLING
Filed May 19, 1932 4 Sheets-Sheet 3
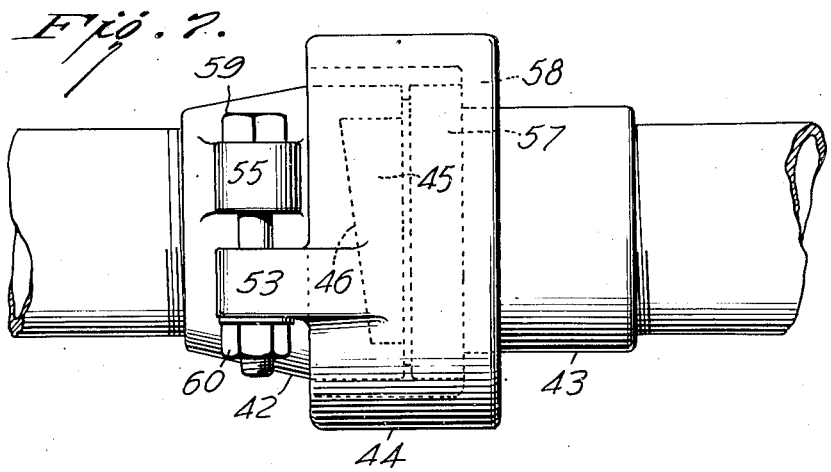
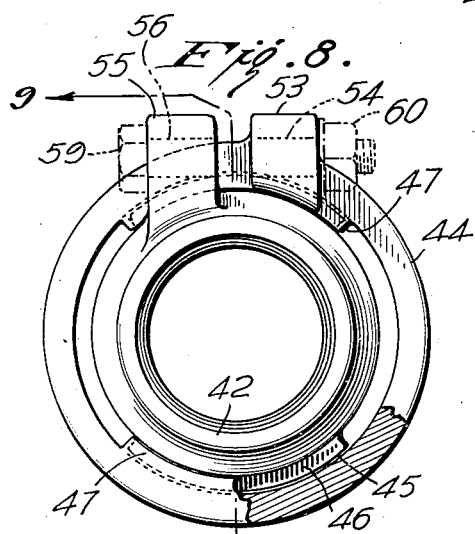
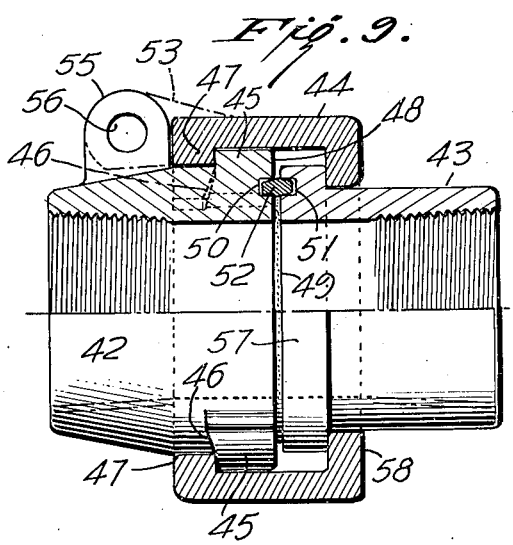
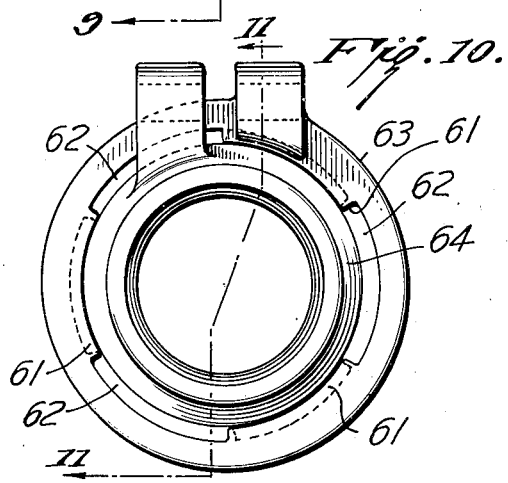
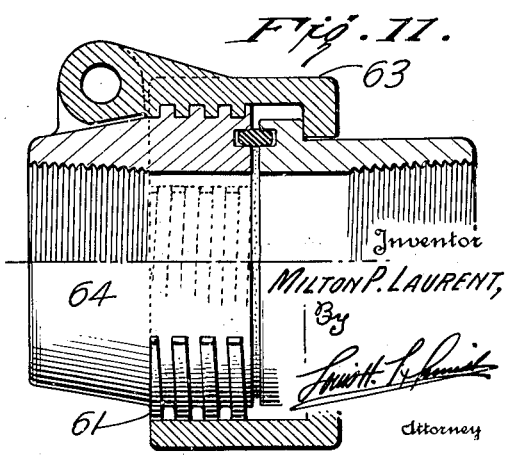
Inventor
MILTON P. LAURENT,
By
Attorney Dec. 24, 1935. M. P. LAURENT 2,025,112
PIPE COUPLING
Filed May 19, 1932 4 Sheets-Sheet 4
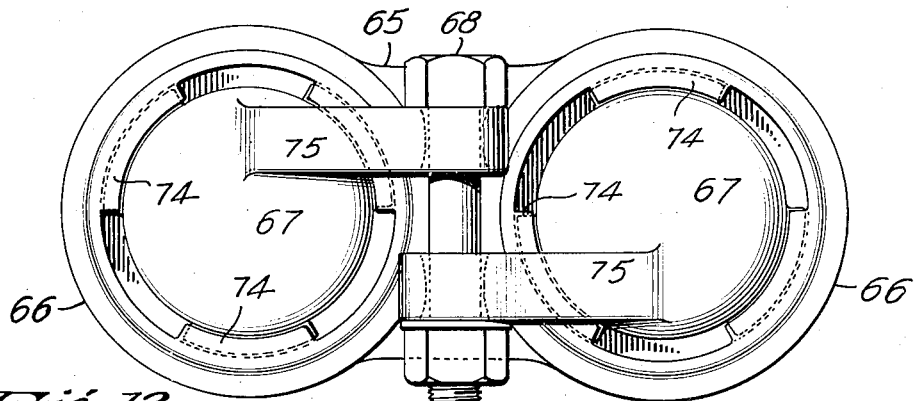
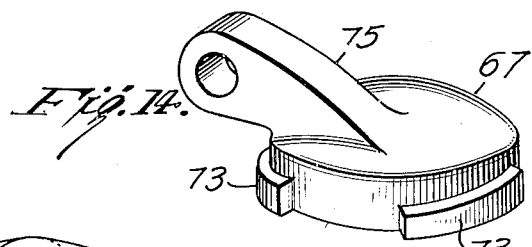
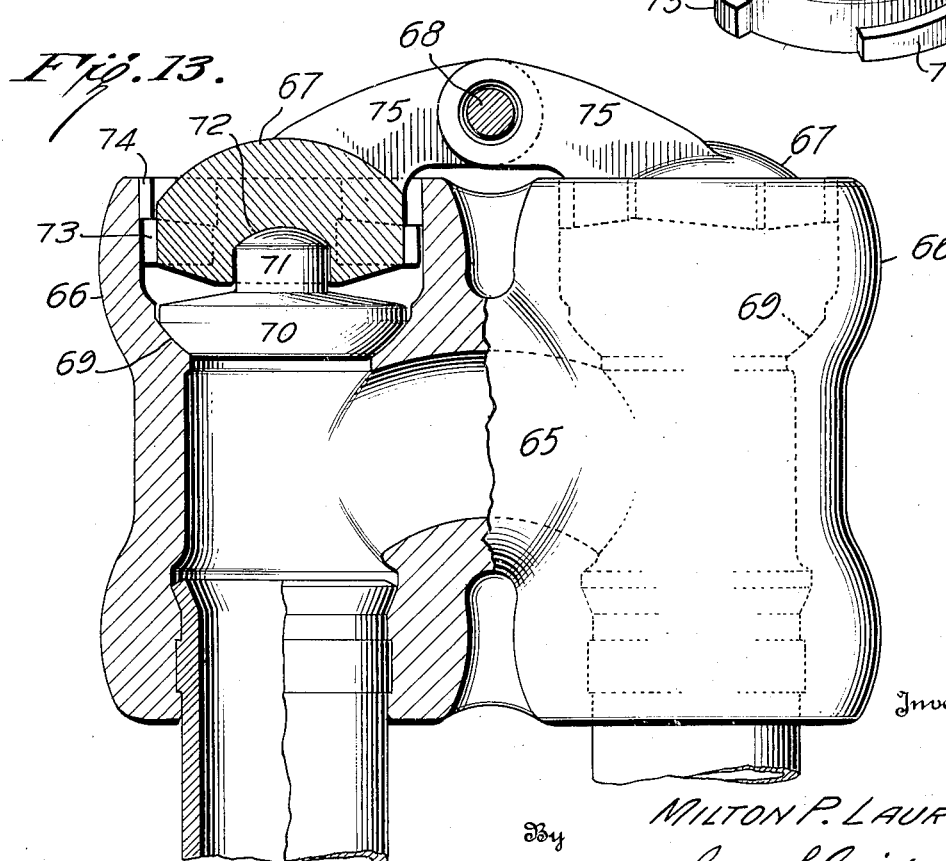
Inventor
MILTON P. LAURENT,
By
Attorney Patented Dec. 24, 1935

2,025,112

UNITED STATES PATENT OFFICE 2,025,112

PIPE COUPLING

Milton P. Laurent, Houston, Tex.

Application May 19, 1932, Serial No. 612,214

4 Claims. (Cl. 285—20)

This invention relates to pipe joints in general, and has particular reference to a sealing and locking device associated therewith.

In pipe joints such as couplings or unions, especially of the heavier type, a great deal of difficulty is experienced in not only effecting a fluid-tight connection, but in maintaining it, which, due to the resultant strains of the pressures has a tendency to become loosened, thereby losing its efficiency, this being especially true in the oil fields. When assembling joints of this nature heavy and awkward tools are usually required and frequently necessitating the services of two men.

In an effort to overcome the above and other disadvantages incidental to this general type of pipe couplings, it is an important object of my present invention to provide an extremely simple, durable, and highly effective device which may be readily assembled in the minimum amount of time with the least effort, and requiring no particular training or skill.

A further object of the invention resides in the provision of a novel structure which permits an assembled joint to be gradually tightened and securely locked against accidental displacement by the operation of a unitary member.

Other objects of this invention will hereinafter be set forth, or will be apparent from the description and the drawings, in which are illustrated a number of embodiments of the device for carrying out my invention.

The nature of this invention regardless of the many forms in which it may be embodied is predicated upon the principle of fluid-way coupling members having mutual or interlocking engaging devices acting to center the coupling members in fluid-tight sealing relation, and an external unitary locking means qualified to maintain the assembly in fluid-tight sealed relation.

This invention first will be described in connection with the accompanying drawings forming a part hereof and then finally claimed.

Referring to the drawings,

Figure 1 is a top plan view of the embodiments of my invention illustrating my improved locking device as associated with a return bend;

Figure 2 is a side elevation thereof, partially broken away and shown in section;

Figure 7 illustrates a top plan view of my invention as applied to a pipe coupling;

Figure 8 is a front view thereof partially broken away;

Figure 9 is a longitudinal sectional view taken on the line 9—9 through Figure 8;

Figure 10 is a front elevation of still another embodiment of my invention as employed in connection with a pipe coupling;

Figure 11 is a sectional view taken on the line 11—11 of Figure 10 and looking in the direction of the arrows;

Figure 12 is a top plan view of another application of my invention illustrating it as applied to the box type return bend;

Figure 13 is a side elevation thereof partially broken away, and,

Figure 14 is a detailed view in perspective of the locking member associated therewith.

Figure 3:
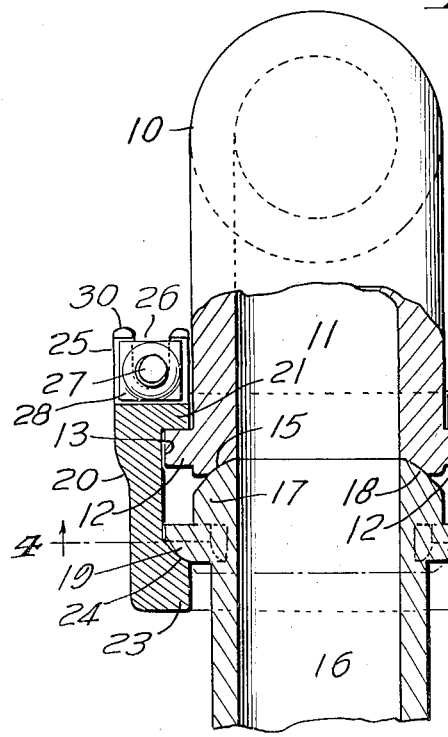
Figure 3 is a vertical sectional view taken on line 3—3 of Figure 2.
Figure 4:
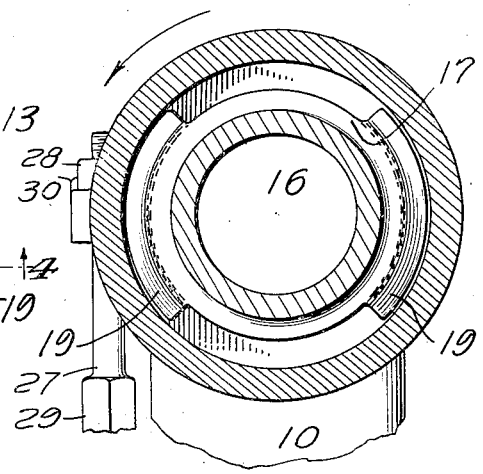
Figure 4 is a transverse sectional view taken on line 4—4 of Figure 3.

Referring now particularly to Figures 1 to 4 inclusive, the hollowed body 10 is provided with a pair of branch members 11, in the form of the usual return bend. Integrally cast or otherwise formed near each end of the branch members 11 is a pair of oppositely disposed and outwardly extending lugs 12 having arcuate outer surfaces 13, preferably formed concentric with their adjacent branch members 11. The upper surfaces 14 of the lugs 12 are angularly disposed and oppositely inclined with respect to each other for a purpose which will be shortly obvious. The underside of each of the branch members 11 adjacent their bores are provided with concave seats 15, as is clearly illustrated in Figure 3 of the accompanying drawings. To obtain the best results, the oppositely disposed lugs 12 are formed slightly less than one fourth of the circumference, that is to say, each of the lugs are slightly less than ninety degrees.

The tubular portions or pipe members 16 are provided near their upper ends with enlarged headed members 17 which terminate at their upper ends with rounded portions 18. These rounded portions 18 are convex and adapted to snugly fit the concave seats 15 of the branch members 11.

A pair of oppositely disposed lugs 19 are rigidly formed adjacent the headed portion 17 and are preferably of the same size and contour as are the lugs 12 previously described. The lower surfaces of the lugs 19 are rounded as is clearly shown in Figure 3.

The sealing member 20 associated with the embodiment of my invention consists of a substantially cylindrical body portion having a pair of inwardly extending and integrally formed teeth 21 at the upper end thereof which extend circumferentially around the branch members 11 and provide spaces 22 therebetween. The lower faces of these inwardly extending teeth 21 are angularly faced and are of substantially the same angle as are the upper faces 14 of the teeth 12 with which they are adapted to engage. The lower portion of the tubular member 20 is provided with an inwardly extending and continuously formed flange 23. This flange is provided with a concave seat portion 24 of substantially the same contour as the mating surfaces of the lugs 19 against which it is adapted to engage.

An outwardly extending arm 25 is preferably cast integrally with each of the cylindrical body portions 20 and is slotted as indicated at 26 for the purpose of receiving a threaded bolt 27. Each end of the bolt 27, it will be noted by referring to Figure 1 in the drawings, is oppositely threaded and is provided with nuts 28 adapted to fit against the outer surfaces of the arms 25. For the purpose of permitting the rotation of the bolt 27 for effectually oscillating or clamping both of the cylindrical body portions simultaneously, as indicated, for example, by the arrows in Figure 1, I provide it with an enlarged polygonal portion 29. Overhanging ledges 30 may be provided upon the outer sides of each of the arms 25 for the purpose of not only preventing the rotation of the nuts 28 but for effectually preventing their displacement with respect thereto.

Figure 5:
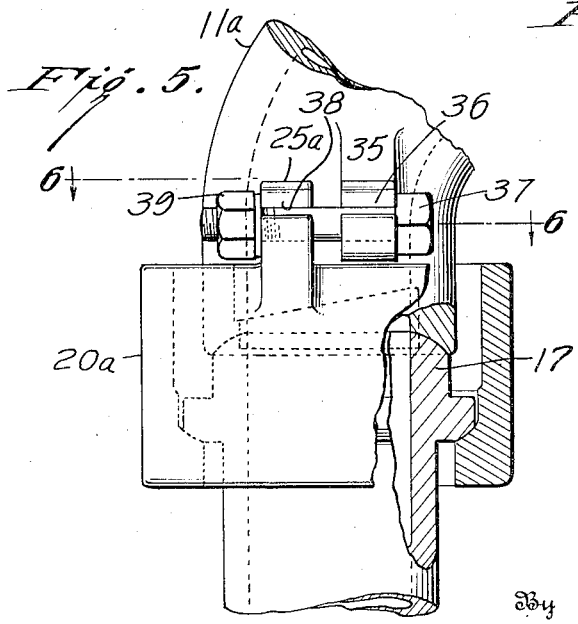
Figure 5 is a fragmentary side elevation partially broken away, as shown in section of another embodiment of my invention.
Figure 6:
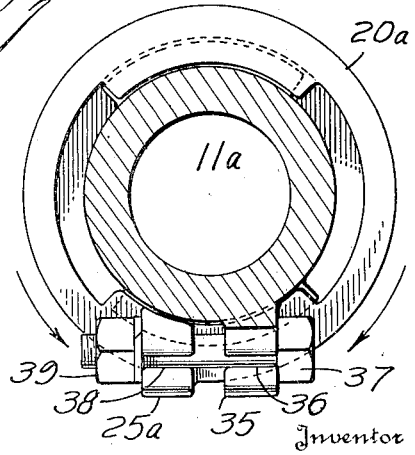
Figure 6 is a transverse sectional view taken on the line 6—6 of Figure 5.

When assembling the return bend, as disclosed in this embodiment of my invention, the tubular members 16 are inserted through the cylindrical body portion 20, the lugs 19 passing between the teeth 21 or rather through the space 22, until the lugs 19 rest upon the annular and concave seat portion 24. Each of the cylindrical body portions 20 are now passed upwardly over the ends of the branch members 11, that is to say, the openings 22 are adapted to align with the outwardly extending lugs 12, whereupon each of the cylindrical body portions 20 are oscillated in reverse directions or as indicated by the arrows in Figure 1. The bolt 27 is then inserted through the slots 26 in the arms 25, permitting each of the nuts 28 to seat below the overhanging ledges 30. The oscillation of the cylindrical body portions 20 caused by the rotation of the bolt 27 will, of course, produce wedging or binding action of the lugs 12 with respect to their mating teeth 21. It will be appreciated that the tightening of the bolt 27 will cause each of the cylindrical body portions to be independently seated with respect to their headed members. I will now describe the embodiment of the invention illustrated in Figures 5 and 6 wherein it will be noted that instead of employing a unitary threaded bolt for simultaneously rotating both of the cylindrical body portions for effecting the sealing connections, I employ a separate threaded bolt for each of the branch members. In these figures, it will be noted, that the branch member 11a is provided with an integrally formed and outwardly extending arm 35 and is slotted as indicated at 36 for receiving the head of a bolt 37. The cylindrical body portion 20a, which is substantially similar to the body portion 20 above described, is provided with an outwardly extending arm 25a and is likewise slotted as shown at 38 for receiving the bolt 37.

When the several portions or elements of this embodiment of my return bend coupling have been assembled, it is merely necessary to manually rotate the cylindrical body portion 20a sufficiently to permit the bolt 37 to be inserted within the slots 36 and 38 of the arms 35 and 25a, whereupon the tightening of the nut 39 will draw the arm 25a toward the stationary arm 35, thereby causing the headed member 17 to be firmly seated against the end of the branch member 11a. In other respects, the details of construction of this embodiment of my invention is substantially similar to the embodiment first described.

The slightly varying embodiment of the invention is illustrated in Figures 7, 8 and 9 which shows the application thereof as readily adaptable for a pipe coupling or union. For the purpose of convenience, I will refer to the section indicated as at 42 as the relatively stationary member, the section 43 as the tubular member and the cylindrical body portion indicated as at 44. As in the embodiments of the invention already described, the stationary member 42 is provided with outwardly extending and integrally formed lugs 45 which are provided with angular faces 46 and are adapted to be engaged by the inwardly extending teeth 47 formed upon the cylindrical body portion 44. Instead of providing a concave seat portion which is adapted to be engaged by a mating end portion as in the previous disclosures, I have found it highly desirable to form the opposing surfaces 48 and 49 of the stationary member 42 and the tubular member 43 with annular depressions 50 and 51 for the purpose of receiving the tapered ring or gasket 52.

An outwardly projecting arm 53 is integrally cast with the cylindrical body portion 44 and is provided near the outer end thereof with a bolt receiving opening 54. An arm 55 is likewise integrally formed upon the outer surface of the stationary member 42 and is apertured as shown at 56, the said aperture being in alignment with the opening 54 in the arm 53.

In assembling this pipe coupling it will be appreciated that the tubular member 43 is first inserted through the cylindrical body portion 44 until the annular flange 57 of the tubular member rests against the inwardly extending flange 58 of the body portion 44. The ring or gasket 52 is then placed in position within either of the depressions 50 or 51. The cylindrical body portion 44 is then passed over the lugs 45 of the stationary member 42. By manually rotating the cylindrical body portion for a relatively short distance, the bolt 59 is inserted through the movable and stationary arms 53 and 55, the effectual locking thereof being accomplished by means of the nut 60.

Instead of providing the stationary member with outwardly extending lugs and its coacting cylindrical body portion with mating teeth as in the embodiments of the invention already described, I may employ a plurality of sets or groups of threads indicated generally as at 61 in Figures 10 and 11. In this embodiment of the invention is disclosed three groups of mutilated threads. The length of the spaces 62 between the threads 61 are slightly greater than the threaded portions, as is clearly shown in Figure 10. Obviously, single, double or even triple threads may be employed, depending upon the size of the coupling and the surface for which it is intended. In assembling or separating the cylindrical body portion 63 from its stationary member 64, but a comparatively slight relative movement is necessary for engagement or disengagement between their respective threaded portions.

Figures 12, 13 and 14 illustrate my invention as applied to a conventional box type return bend. In this embodiment of my invention, as already disclosed in Figures 1 to 4, I employ a hollowed body 65 having a pair of branch members 66, sealing members 67 and a unitary threaded bolt 68 for simultaneously fastening the sealing members with respect to the branch members.

Each of the branch members 66 is provided with a concave seat 69 for the purpose of being engaged by mating discs 70 which are adapted to be securely held in place by means of the sealing members 67, as is clearly shown in Figure 13. It has been found highly desirable, in fitting the discs 70 with respect to their seats 69, to form them separately from the sealing members 67. This may be readily accomplished by means of the upwardly extending projection 71 being integrally formed with each disc 70 and adapted to be held against displacement by means of the recess 72. This novel construction has been found highly practical for the reason that there may readily be a slight variance between the seat 69, its mating disc 70 and the sealing member 67 with its respective camming means.

The camming means, it will be readily obvious, consists of the outwardly extending lugs 73, integrally formed with the sealing member 67 and the inwardly projecting teeth 74 of the branch members 66. The opposing or contacting surfaces between the lugs 73 and their mating teeth 74 are, of course, beveled or provided with an angle suitable to effectually seal the several members.

The outwardly extending arms 75 may be integrally cast upon the upper sides of the sealing members 67. Suitable openings may be formed near the outer ends of the arms 75 for receiving the threaded bolt 68. It will be appreciated that this novel arrangement of sealing members and their respective arms 75, since they are identically formed thereby permitting their interchangeability, a material saving in the cost of manufacture, replacement and upkeep is effected.

What I claim is:

1. In return-bend pipe construction; a pair of conduits positioned in substantially parallel relationship; means for sealing the ends of both conduits including a return-bend, and devices cooperating with the return-bend and the conduit ends to prevent passage of fluid in said construction other than from one conduit through the return bend to the other conduit; the devices being removably associated with the conduit ends and being moved into or out of passage-preventing position by cooperating cam faces at each conduit end; one of the devices at each conduit end having an apertured lug and being itself rotatable; the lugs of the devices of the two conduits, when the devices are assembled for passage prevention, being positioned so that their apertures are substantially aligned; and a single bolt extending between the lugs for effecting movement of the lugs towards each other and to cause the cam faces at each conduit end simultaneously to make the sealing means effective for sealing both conduits.

2. In return-bend pipe construction; a pair of conduits positioned in substantially parallel relationship; means for sealing the ends of both conduits including a return-bend, and devices cooperating with the return-bend and the conduit ends to prevent passage of fluid in said construction other than from one conduit through the return bend to the other conduit; the devices including a seat at the end of each conduit; a plug for the seat; and means for forcing the plug down upon the seat, comprising a camming member, the camming member and the conduit end having cooperating projections for effecting movement of the camming member to drive the plug against the seat on rotation of the camming member; each camming member having an apertured lug; the lugs, when the camming members are associated with the conduit ends, being positioned so that their apertures are substantially aligned; and a single bolt extending between the lugs for effecting movement of the lugs towards each other and to force both plugs simultaneously against their respective seats.

3. In return-bend pipe construction; a pair of conduits positioned in substantially parallel relationship; a return-bend associated with the ends of the conduits; and means for sealing the return-bend and the conduit ends together to form a single continuous passage therethrough; the sealing means including a coupling member at each conduit end; shoulders on the coupling member, conduit, and return bend at each conduit end; the shoulders cooperating with each other so that, on rotation of the coupling member with relation to the conduit end, the conduit ends and the return bend will be driven together into sealing relationship; and a single member extending between and engaging the coupling members, so that when a force is applied through said single member, simultaneous rotation of both coupling members will be effected to drive the return bend simultaneously into sealing relationship to both conduit ends.

4. In return-bend pipe construction; a pair of conduits positioned in substantially parallel relationship; a return-bend having its ends brought into end to end relationship to the ends of the conduits; and means for driving the return-bend and the conduit ends together to form a single continuous passage therethrough; the driving means including a coupling member at each conduit end; the return bend and the conduits having lateral projections from the outer faces thereof; the coupling members being positioned over the associated return bend and conduit ends and being provided with inwardly directed projections to engage the lateral projections from conduits and return bend; some of the lateral projections and the inwardly directed projections being formed to cooperate with each other as wedging cam faces; and means for compelling each coupling member, the return bend, and its respective conduit end to move relatively to each other for making the cam faces effective to drive the respective conduit and return-bend ends together; the compelling means comprising an ear on each coupling member; and a single bolt carried between the ears, so that on actuating the bolt, the ears will be caused to move relatively to each other simultaneously to rotate both coupling members for driving the return bend and the conduit ends together.

MILTON P. LAURENT.